3,255,244
METALLOBORAZENE DERIVATIVES AND
THEIR PREPARATION
Ross I. Wagner, Whittier, Calif., assignor to American Potash & Chemical Corporation, Los Angeles, Calif., a corporation of Delaware
No Drawing. Filed Nov. 30, 1961, Ser. No. 156,156
3 Claims. (Cl. 260—551)

This invention relates, in general, to novel metalloborazene derivatives. More specifically, this invention relates to N-metalloborazene derivatives and their methods of preparation.

The desirable properties, particularly the neutron absorption and thermal stability of borazene compounds have long been known. However, it has been very difficult to utilize these properties in practical applications because of the difficulty in preparing borazene derivatives which can serve as intermediates for the preparation of borazene compounds having suitable physical properties for the specific utility desired. Particular difficulty has been experienced in obtaining borazene derivatives in which the borazene ring is unsymmetrically substituted with reactive functional substituents.

Whether or not a borazene derivative is symmetrically substituted depends on the nature of the substituents which are attached to the cyclic atoms in it. Cyclic atoms are defined as those nitrogen and boron atoms which form the borazene ring itself. If a borazene derivative is symmetrically substituted all of the substituents attached to the cyclic nitrogen atoms will be identical, and all of the substituents attached to the cyclic boron atoms will be identical. The substituents attached to the cyclic boron atoms can be the same or different from those attached to the cyclic nitrogen atoms. An unsymmetrically substituted derivative is one with at least one of the substituents on the ring which is different from the other substituents which are attached to like cyclic atoms. Thus, B-trimethylborazene and N-triethyl-B-tricyclohexylborazene are symmetrically substituted borazene compounds while B-dimethyl-B-ethylborazene and N-phenyl-B-trimethylborazene are unsymmetrically substituted borazene compounds. Reactive functional substituents are those which can be readily reacted with other compounds whereby various derivatives of borazene can be prepared.

The borazene derivatives heretofore available have, in certain respects, limited utility, both in their own right and as intermediates for the preparation of other borazene derivatives. These prior borazene derivatives are difficult to obtain as pure compounds because they are contaminated with impurities or are present as mixtures of various derivatives. Also, these prior derivatives are largely available only as symmetrically substituted compounds. Those prior derivatives which can be utilized as intermediates are of limited value because the reactive functional substituents are primarily attached only to the boron atoms in the borazene ring. Unsymmetrically substituted borazene derivatives which carry reactive metallic functional substituents on one or more of the nitrogen atoms of the borazene ring have not heretofore been available.

Broadly, the metalloborazene derivatives, according to the present invention, provide reactive substituents attached to at least one cyclic nitrogen atom. These reactive substituents can be selectively positioned on as many of the cyclic nitrogen atoms as desired.

More particularly, metalloborazene derivatives of this invention provide reactive metallic functional substituents attached to any one or all of the three cyclic nitrogen atoms in the borazene ring. Since metallic functional substituents are very reactive and can be replaced readily, these metalloborazene derivatives are particularly useful as intermediates in preparing other borazene derivatives. Many useful derivatives can be prepared using these N-metalloborazene derivatives because of the great flexibility achieved by being able to select specific mono-, di-, and tri-N-reactive borazene intermediates. The di- or tri-N-reactive substituted borazenes are particularly useful in the preparation of inorganic polymers such as described in my co-pending application Serial No. 156,155, filed November 30, 1961 and assigned to the same assignee as the present invention.

Metalloborazene derivatives of this invention have the formula:

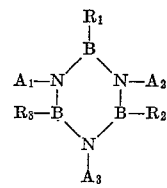

In this formula $R_1$, $R_2$, and $R_3$ can be any of alkyl, alicyclic, or arene radicals— and $A_1$, $A_2$, and $A_3$ can be any of hydrogen, alkali metal, alkaline earth metal, aluminum, cadmium, zinc, alkyl, alicyclic or arene substituents, provided that at least one of $A_1$, $A_2$ or $A_3$ is an alkali metal, alkaline earth metal, aluminum, cadmium, or zinc substituent.

Any of the radicals $R_1$, $R_2$, or $R_3$ can be the same as or different from the others, each being independently selected from the above group of specific $R_1$, $R_2$ or $R_3$ radicals. Likewise, $A_1$, $A_2$ and $A_3$ can be the same as or different from one another and are each independently selected from the above group of specific $A_1$, $A_2$ or $A_3$ radicals.

The N-metalloborazene derivatives of this invention range from liquids to solids. They are useful, for instance, in addition to the preparation of the polymers described in the above identified copending application, Serial No. 156,155, filed November 30, 1961, as components in or reactants for, the preparation of flame resistant compositions, plasticizers, fuel additives, neutron absorbers, cross-linking agents, rocket fuels, dyes, pigments, insecticide, bactericides, pesticides, fungicides and the like.

The preparative methods heretofore attempted for the manufacture of borazene derivatives, and in particular derivatives which are unsymmetrically substituted as to reactive substituents on cyclic nitrogen, are very complex, difficult to carry out and produce unsatisfactory products.

Broadly, in accordance with the present invention, it has been determined that N-metalloborazene derivatives can be prepared by treating certain borazene compounds with an organometallic compound. The process is applicable to the preparation of mono-, di-, and tri-N-metalloborazene derivatives.

More specifically, the process of the present invention comprises reacting a borazene derivative having the formula:

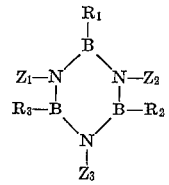

with an organometallic compound having the formula:

$$R_{\bar{x}}M$$

In the above formula the organic moiety, R, can be any inert organic radical as is more specifically described later; the metallic moiety, M, can be any of the following metallic functional substituents, alkali metal, alkaline earth metal, zinc, cadmium, aluminum; $x$ is an integer equal to the valence of M; $R_1$, $R_2$ and $R_3$ are as defined above; $Z_1$, $Z_2$ and $Z_3$ can be any of the substituents: hydrogen, alkyl, alicyclic or arene substituents, with the provision that at least one of these Z substituents is hydrogen.

While I do not wish to be limited to any theory it is believed that the reaction by which N-metalloborazene derivatives are prepared involves the replacement of hydrogen on the cyclic nitrogens with the metallic moiety from the organometallic compound. The displaced hydrogen combines with the organic moiety from the organometallic compound.

It is desirable to choose the organic moiety so that it can be removed readily from the reaction mixture after it has combined with an atom of hydrogen. Thus, if R is a methyl substituent, methane can be removed from the reaction mixture, which will drive the reaction in the desired direction. Conversely, if R is chosen so as to be a large heavy moiety, the N-metalloborazene products can be removed, leaving the hydrogenated R substituent behind.

Cyclic atoms are preferably blocked by organic radicals during the above reaction to prevent the organic moiety of the organometallic compound from attacking the boron atoms. Thus, the cyclic boron atoms are blocked by attaching an alkyl, alicyclic or arene substituent to each of them before metallic functional substituents are attached to the cyclic nitrogen atoms.

The number of metallic functional substituents which become attached to the cyclic nitrogen atoms is determined primarily by the molar ratio of the starting materials. If one mole of organometallic compound is allowed to react with one mole of borazene derivative a mono-N-metalloborazene derivative will be obtained. If two moles of organometallic compound is allowed to react with one mole of borazene the di-N-derivative will be obtained. The tri-N-derivative is produced in like manner.

The reaction is preferably carried out under an inert atmosphere and anhydrous conditions. An inert reaction environment is desirable because the organometallic reactant is often easily decomposed by contact with air, carbon dioxide or moisture. The reaction is conveniently conducted by admixing the reactants in a sealed vessel under a vacuum or a blanket of inert gas such as nitrogen, helium, etc. Preparation of metalloborazene derivatives can be accomplished in batch or continuous operation.

Cooling and heating steps can be provided in the process as desired. The temperature at which the reactions take place is not critical. The effect of varying the reaction temperature up or down is a corresponding increase or decrease in the rate of reaction. Room temperature generally provides a sufficient rate of reaction. In general it is convenient to adjust the temperature of reaction by appropriately heating or cooling the reaction mixture to below the boiling point and above the freezing point of the reaction mixture. The reaction can be conducted at atmospheric, sub-atmospheric or super-atmospheric pressure as desired without any substantial effect on the course of the reaction.

Generally, the N-metalloborazene derivative which is recovered from the reaction is not isolated from the reaction medium because it is very reactive and may decompose unless ideal conditions of purity and temperature are maintained when the product is in the isolated state. Also, these derivatives are generally used as intermediates in further reactions so it is desirable to leave them in this medium because it serves as a carrier which can be added to other reaction mixtures. If is convenient to leave these derivatives in the reaction medium when they are used, for example, as fungicides because they are easily applied in this form to the area being treated. In some instances, where the derivatives are recovered as solid precipitates, they can be isolated from the reaction medium by conventional techniques such as filtration.

In general, the solubility of N-metalloborazene compounds in any given solvent decreases with an increase in the number of metallic functional substituents attached to the borazene radical.

The solvent used as the reaction medium of the process is not critical, it being only necessary that it not complete with the borazene derivative for the metallic functional substituents and that it be compatible with all the reactants and the product. Particularly useful solvents include: aliphatic ethers such as diamyl ether, diheptyl ether, isobutyl neopentyl ether, diisopropyl ether, dimethyl ether, diethyl ether, dipropyl ether, butyl ethyl ether, hexyl methyl ether; arene ethers such as anisole, phenetole, diphenyl ether, veratrole, benzyl phenyl ether; cyclic ethers, such as tetrahydrofuran, dioxane, tetrahydropyran; arene or aliphatic hydrocarbons, such as diisoamyl, hexane, n-hexadecane, cyclohexane, iso-octane, cyclopentane, trimethylpentane, 2-methylpentane, isopentane, methylcyclohexane, benzene, octadecyclohexane, toluene, P-xylene, naphtha, butylbenzene, ethylbenzene, cumene, octadecylbenzene, etc.

Mixtures of solvents can be employed if desired. The aliphatic ether solvents are particularly useful because they are good solvents for the reactants and product, they are inexpensive, readily available and when the product is left in solution they provide an excellent reaction medium for further reactions.

The borazene derivatives used in the preparation of these N-metalloborazene derivatives can be prepared in a variety of ways including the copyrolysis of a mixture of triorganoborine adducts of ammonia and substituted amines or the pyrolysis of substituted aminoborines.

A particularly desirable process for the preparation of the borazene derivative starting materials used in the invention involves the reaction of a trihaloborine with an organometallic compound to produce triorganoborine and halometallic compounds. The triorganoborine is then pyrolized with ammonia to produce B-substituted derivatives which are the borazene derivative starting materials for the process of this invention.

A convenient method of preparing the preferred organometallic compound used in this process involves reacting two moles of alkali metal and one mole of haloorganic compound to produce one mole of alkali metal halide and one mole of organometallic compound.

In the following examples, all of the metalloborazene derivatives are prepared in containers sealed with a rubber septum closure through which materials are added or removed by means of a hypodermic syringe. These precautions are necessary to avoid contact with atmospheric moisture and other impurities which might decompose the organometallic compound or the metalloborazene product.

In the specification, claims and following examples all parts and percentages are by weight unless otherwise specified. The following examples are submitted to illustrate and not to limit this invention.

*Example I*

Liquid N-dimethyl-B-trimethylborazene in the amount of 0.2704 g. (1.795 mmoles) is placed in a 6 ml. nitrogen-filled glass bomb tube and cooled to −196° C. A layer of degassed diethyl ether is added and frozen above the N-dimethyl-B-trimethylborazene. A 0.95 M solution of methyl-lithium in diethyl ether in the amount of 1.90 ml. (1.805 mmoles) is added from a syringe on top of the layer of frozen ether and the tube is sealed under vacuum while being maintained at −196° C. The layer of frozen ether is used to prevent any reaction taking place until the tube has been sealed. This procedure of freezing a layer of ether between the reactants is used so that the gaseous reaction product can be collected and measured accurately as a means of identifying the product by determining the extent of reaction. For purpose of forming the product it is only necessary to mix the reactants at any temperature from —75° C. to their boiling point, but for purposes of measuring the gaseous reaction products a carefully sealed reaction vessel and low temperature conditions are used. The sealed tube is warmed to ambient temperature whereupon a reaction takes place as soon as the frozen layer of ether melts and the reactants become admixed. When effervescence of the mixture has ceased, the tube is warmed briefly to 50° C. to insure that the reaction is completed. The tube and its contents are then cooled to ambient temperature. Upon opening the tube 40.14 cc. of methane gas is removed. This amount of methane gas is 99.8% of the amount which theoretically should be obtained from the reaction of all the methyllithium.

The product is identified by reaction with methyliodide under anhydrous conditions to form the well-known derivative, hexomethylborazene. A 0.2598 g. (1.830 mmoles) quantity of methyliodide is added to the degassed ether solution of the product at —196° C. and the reaction tube is sealed. The tube and its contents are heated briefly to 50° C. while agitating the contents, and then cooled to —196° C. before being opened. The compound produced by the reaction between methyliodide and the product was purified by high vacuum sublimation at 100° C. The purified compound obtained in the amount of 0.5016 g. is identified by infrared analysis as hexamethylborazene. The product of the reaction of N-dimethyl-B-trimethylborazene and methyllithium is identified as N-lithiopentamethylborazene. This identification is based upon the amount of hydrogen evolved during both the formation of the product and the reaction with methyliodide, and the fact that the product and methyliodide react to give hexamethylborazene.

*Example II*

N-methyl-B-trimethylborazene is added to a 6 ml. nitrogen filled bomb tube in the amount of 0.6892 g. (5.044 mmoles). The tube and its contents are cooled to —196° C., and a layer of degassed diethyl ether is added and frozen above the N-methyl-B-trimethylborazene. A 0.95 M diethyl ether solution of methyllithium in the amount of 10.1 mmoles is syringed into the tube onto the frozen ether layer. The tube is then sealed under vacuum at —196° C. and warmed to ambient temperature whereupon the ether layer melts with resultant mixing and reaction of the reactants. When effervescence of the mixture has ceased the tube is heated briefly to 50° C. to insure complete reaction after which it is permitted to cool to room temperature. An ethereal solution of a product identified as N-dilithiotetramethylborazene is obtained. Identification is accomplished by reaction with methyliodide to produce hexamethylborazene.

*Example III*

B-trimethylborazene in the amount of 1.3511 g. (11.02 mmoles) is placed in a 30 ml. glass bomb tube and cooled to —196° C. A layer of degassed diethyl ether is added to the tube and frozen above the surface of the B-trimethylborazene. The glass bomb is then filled with dry nitrogen and closed with a rubber septum. A 0.95 M diethyl ether solution of methyllithium in the amount of 11.6 ml. (11.0 mmoles) is syringed into the closed glass bomb tube. The tube and its contents are warmed to ambient temperature. After effervescence has ceased the tube is opened and an ethereal solution containing a product identified as N-lithio-B-trimethylborazene is recovered.

The crude solution of N-lithio-product is reacted with methyliodide under anhydrous conditions to produce N-methyl-B-trimethylborazene, which confirms the identification of the product as N-lithio-B-trimethylborazene.

*Example IV*

N-dilithotetramethylborazene is produced continuously by continuously introducing and mixing, in a reaction medium of diethyl ether, N-methyl-B-trimethylborazene and methyllithium. The reactants are provided in a ratio of two moles of methyllithium for each mole of N-methyl-B-trimethylborazene. The reaction temperature is kept at about 30° C. and anhydrous conditions are maintained. Nitrogen gas is used to sweep the gaseous reaction products out of the reaction chamber. The system is adjusted so that about 20 minutes reaction time is provided.

The procedure of Example 1 is repeated except that methylrubidium is used instead of methyllithium. The ethereal solution of product identified as N-rubidiopentamethylborazene is reacted with methyl iodide to produce hexamethylborazene.

The procedure of Example 1 is repeated except that ethylcesium is used instead of methyllithium. The N-cesiopentamethylborazene product is reacted with methyl iodide to produce hexamethylborazene.

Example 2 is repeated except that dioxane is used as the solvent, N-propyl-B-tripropylborazene is used as the borazene derivative and cyclohexylpotassium is used as the organometallic. The product identified as N-dipotassiotetrapropylborazene is reacted with propyl iodide to produce hexapropyl borazene.

The procedure of Example 1 is repeated except that phenylsodium is used instead of methyllithium. The borazene derivative used is N-dipentyl-B-triphentylborazene. The N-diphentyl-B-tripentylborazene and phenylsodium are reacted in a molar ration of one to one in a solution of diisopropyl ether. The product of this reaction is identified as N-sodiopentapentylborazene.

The reaction of diisopropylmagnesium with an equimolar amount of N-dimethyl-B-methyl-B-diisopropylborazene in a hexyl methyl ether reaction medium substantially according to the procedure described in Example 1 produces a product identified as magnesium bonded to N-dimethyl-B-methyl-B-diisopropyl-N-borazyl.

The procedure of Example 1 is repeated using equimolar amounts of trihexyl aluminum and N-methyl-N-isopropyl-B-trimethylborazene in a reaction medium consisting of equal parts by weight of diethyl ether and octadecyclcyclohexane. The product of this reaction is identified as aluminum bonded to N-methyl-N-isopropyl-B-trimethyl-N-borozyl.

Following the procedures of Example 1 a product identified as N-lithio-N-cyclobutyl-N-octyl-B-methyl-B-tolyl-B-cyclohexylborazene is produced by the reaction of methyllithium and N-cyclobutyl-N-octyl-B-methyl-B-tolyl-B-cyclohexylborazene in equimolar proportions. The procedure differs from that of Example I in that the reactants are admixed and allowed to react at room temperature without going through any of the low temperature and high vacuum procedure described in Example I. The reaction is conducted under anhydrous conditions to reduce the possibility of undesirable by-products being formed.

A product identified as N-lithio-N-dimethyl-B-trimethylborazene is produced by the reaction of equimolar quantities of phenyllithium and N-dimethyl-B-trimethylborazene, in isopentane, at a reaction temperature of —50° C. The reaction is conducted under anhydrous conditions.

The procedure of Example 2 is repeated using 2 moles of methylmagnesium chloride for each mole of N-methyl-B-trimethylborazene, in tetrahydrofuran. A product identified as N-bis (chloromagnesio)-N-methyl-B-trimethylborazene is obtained.

Equimolar amounts of dimethylberyllium and N-methyl-B-methyl-B-diethylborazene are reacted in a reaction medium consisting of equal parts by weight of cumene and ethyl methyl ether substantially in accordance with the procedures of Example 2. A product identified as beryllium bonded to N-methyl-B-methyl-B-diethyl-N-borozyl is obtained.

The procedure of Example 2 is repeated using equimolar amounts of dimethylcalcium and N-methyl-B-tripropylborazene in a reaction medium consisting of equal parts by weight of diamyl ether and p-xylene. A product identified as calcium bonded to N-methyl-B-tripropyl-N-borozyl is obtained.

A product identified as strontium bonded to N-ethyl-B-triethyl-N-borozyl is obtained by reacting, according to the procedures set forth in Example 2, equimolar quantities of dimethylstrontium and N-ethyl-B-triethylborazene in a reaction medium of equal parts by weight of diethyl ether and dinaphthyl ether.

The procedure of Example 2 is repeated except that dimethylbarium is used in place of methyllithium and a diisoamyl ether solvent is used. A product identified as barium bonded to N-methyl-B-trimethyl-N-borazyl is obtained.

The procedures of Example 2 are repeated using dimethyl-cadmium and a reaction medium of hexyl methyl ether. A product identified as cadmium bonded to N-methyl-B-trimethyl-N-borazyl is obtained.

Equimolar quantities of dodecyllithium and N-dodecyl-B-trimethylborazene are reacted in pentane at a temperature of +70° C. and a super atmospheric pressure of about 20 lbs. per square inch guage. A good yield of a product identified as N-lithio-N-dodecyl-B-trimethylborazene is obtained.

Equimolar amounts of dimethylzinc and B-tricyclopentylborazene are reacted in dimethyl ether to yield a product identified as zinc bonded to B-tricyclopentyl-N-borazyl.

Equimolar amounts of phenylpotassium and B-methyl-B-cyclohexyl-B-phenylborazene are reacted according to the procedure of Example 3 in a mixture of tetrahydropyran and benzene to produce a product identified as N-potassio-B-methyl-B-cyclohexyl-B-phenylborazene.

Three moles of methyllithium are reacted with one mole of B-tributylborazene according to the procedure of Example 3 to produce the product N-trilithio-B-tributylborazene.

Two moles of methylpotassium are reacted with one mole of B-trimethylborazene according to the procedure of Example 3 in order to produce the product N-dipotassio-B-trimethylborazene. Naphthalene and propyl ether are used as the reaction medium and the reaction is conducted at +50° C.

The substituents $R_1$, $R_2$ and $R_3$, attached to the cyclic boron atoms, and the substituents $Z_1$, $Z_2$ and $Z_3$ or $A_1$, $A_2$ and $A_3$ which are attached to the cyclic nitrogen atoms can each be independently selected from the following list of illustrative but not all-inclusive substituents: alkyl substituents such as ethyl, methyl, iso-amyl, neopentyl, decyl, hexyl, propyl, 2-methylpentyl, 5-methylhexyl, pentyl, dodecyl, butyl; alicyclic substituents such as cyclopentyl, cyclohexyl, cyclopropyl, cycloheptyl, 4-methylcyclohexyl, 3-butylcyclopentyl, 3,5-diethylcyclohexyl, cyclobutyl; arene substitutents such as 2,4-xylyl, m-cumenyl, phenyl, 2-methoxyphenyl, mesityl, biphenyl, naphthyl, indanyl, tolyl, etc.

It will be understood that on any particular borazene ring $R_1$, $R_2$, and $R_3$ and $A_1$, $A_2$, and $A_3$ or $Z_1$, $Z_2$, or $Z_3$ can be the same or completely different substituents, provided, of course, that at least one Z substituent is hydrogen and at least one A substituent is a metallic functional substituent.

The alkyl, alicyclic and arene substituents of this invention preferably have between 1 and 12 carbon atoms. Substituents having more than 12 carbon atoms tend to cause such steric hindrance that reactions become difficult to carry out.

The metallic functional substituents which are attached to the cyclic nitrogen atoms can be any of the alkali metals, lithium, sodium, potassium, rubidium or cesium; the alkaline earth metals beryllium, calcium, strontium, magnesium or barium, or the metals zinc, cadmium, or aluminum. Preferably alkali metals are used because they produce the best yields of metalloborazene derivatives. Also, alkali metals do not form the complex compounds having more than one borazene ring attached to the same metallic functional substituent such as may be formed by the multi-valent metallic functional substituents. Lithium substituents have been found particularly desirable because the lithioborazene derivatives are very reactive so as to yield other derivatives readily, and organolithium reactants are readily available both in quantity and variety.

Illustrative of the metalloborazene derivatives of this invention but not all inclusive thereof, are the following:

N-lithio-B-tripropylborazene
N-dilithio-B-tricyclohexylborazene
N-dilithio-B-trioctylborazene
B-tricyclopentyl-N-borazyl calcium derivative
N-disodio-B-triphenylborazene
N-rubidio-B-tricumenylborazene
N-dipotassio-B-tribiphenylborazene
N-tripotassio-B-tripentylborazene
N-borazyl strontium derivative
N-dicesio-B-triethylborazene
B-tricyclobutyl-N-borazyl aluminum derivative
N-di(chloromagnesio)-B-tribiphenylborazene
N-dirubidio-B-trimethylborazene
B-triethyl-N-borazyl cadmium derivative
B-tributyl-N-borazyl barium derivative
B-tricyclopentyl-N-borazyl zinc derivative
N-sodio-B-methyl-B-dicyclohexylborazene
N-tripotassio-B-trineopentylborazene
N-iodomagnesio-B-butyl-B-dicyclopentylborazene
N-bromomagnesio-B-ethyl-B-diphenylborazene
N-fluoromagnesio-B-ethyl-B-cyclohexyl-B-phenylborazene
N-trisodio-B-trinaphthylborazene
B-tripentyl-N-borazyl magnesium derivative
N-dilithio-N-propyl-B-diphenyl-B-cyclohexylborazene
N-lithio-B-tridodecylborazene
N-sodio-N-methyl-B-trineopentylborazene
N-potassio-N-lithio-B-trimethylborazene
B-trimethyl-N-borazylene dicalcium derivative
B-tripropyl-N-borazylyne trialuminum derivative While I do not wish to be limited to any theory it is believed that the multivalent metallic functional substituents are attached to more than one borazene ring. Thus, there are believed to be two borazene rings attached to one atom of calcium and three to one atom of aluminum. The multivalent metals need not be attached only to cyclic nitrogen atoms, e.g., if a Grignard reagent is used, one atom of magnesium will be attached to one cyclic nitrogen atom and one halogen atom. Either hydrogen or halogen can be attached to multivalent metallic functional substituents which are also attached to cyclic nitrogen atoms.

Preferably the N-metallogorazene derivatives of this invention are the mono- and di-metallic functional substituted derivatives because these are easier to prepare and are obtained in better yield than are the tri-metallic functional substituted derivatives. Also, the mono- and di-derivatives have wider application in the preparation of other compounds. The di-derivatives can be used to produce thermopalstic linear polymers such as those described in my copending application, Serial No. 156,155, filed November 30, 1961. The tri-derivatives will also produce a polymer but it will be an infusible cross-linked thermosetting polymer. The mono- and di-derivatives can be used to produce unsymmetrical borazene compounds which are impossible to obtain in any other way while the tri-derivatives upon further reaction generally produce symmetrical compounds, many of which can be obtained in other ways.

Specific examples of the organometallic compounds $(R_xM)$ employed in the preparation of the metalloborazene derivatives of this invention include the following:

Butyllithium,
Methyllithium,
Cyclohexyllithium,
Iso-amyllithium,
Diethylzinc,
Tributylaluminum,
Dodecylpotassium,
Methylcesium,
Ethylrubidium,
3-butylcyclohexylpotassium,
Dipropylcalcium,
Cyclobutylsodium,
Dinaphthylbarium,
Dimethylcadmium.
Diethylbarium,
Methylmagnesium chloride,
Butylmagnesium fluoride,
Phenylmagnesium bromine,
3-butylcyclohexylmagnesium iodide,
Cyclopentylmagnesium chloride,
Dimethylstrontium,
Biphenylmagnesium bromine,
Dicyclohexylmagnesium,
Dimethylmagnesium,
Ethylmagnesium iodide,
Diphenylstrontium,
Cyclohexylsodium,
Naphthyllithium, etc.

The nature of the organic moiety in the organometallic compounds is not critical, since it does not become a part of the desired product. Substantially any organic moiety which is capable of combining with the above listed metals and particularly the alkali metals is satisfactory. Particularly useful organic moieties are those alkyl, alicyclic and arene substituents defined above with reference to $R_1$, $R_2$ and $R_3$.

Conveniently, the organometallic compounds employed in this invention are those wherein the organic moiety is a lower alkyl radical. These lower aliphatic radicals, upon combining with the hydrogen as it is displaced from the cyclic nitrogen atoms, become volatile gases which can be removed from the reaction mixture. The removal of one reaction product in this manner tends to drive the reaction to completion and simplifies purification of the desired product.

Metallogorazene derivatives according to this invention are capable of undergoing a large number of reactions with other compounds so as to produce useful borazene derivative products. For example, the metalloborazene derivatives of this invention can be reacted with halogen containing compounds to produce the N-substituted borazene derivatives of that compound. For example, these derivatives can be reacted with alkyl halides and boron halides such as butyldichloroborine or diphenylchloroborine.

As will be understood by those skilled in the art, what has been described is the preferred embodiment of the invention, however, many modifications, changes and substitutions can be made therein without departing from the scope and the spirit of the following claims:

I claim:
1. N-lithiopentamethylborazene.
2. N-dilithiotetramethylborazene.
3. N-methyl-N-lithio-B-trimethylborazene.

References Cited by the Examiner
UNITED STATES PATENTS
2,917,543  12/1959  Smalley et al. _____ 260—551

WALTER A. MODANCE, *Primary Examiner.*

IRVING MARCUS, *Examiner.*

JOSEPH W. MOLASKY, JOHN D. RANDOLPH,
*Assistant Examiners.*